(No Model.)

W. H. WRIGLEY.
COFFEE POT.

No. 476,718. Patented June 7, 1892.

WITNESSES:
Fred G. Dieterich
P. B. Turpin

INVENTOR:
W. H. Wrigley.
BY Munn & Co
ATTORNEYS

United States Patent Office.

WILLIAM H. WRIGLEY, OF NEW ORLEANS, LOUISIANA.

COFFEE-POT.

SPECIFICATION forming part of Letters Patent No. 476,718, dated June 7, 1892.

Application filed October 10, 1891. Serial No. 408,371. (No model.)

*To all whom it may concern:*

Be it known that I, WILLIAM H. WRIGLEY, residing at New Orleans, in the parish of Orleans and State of Louisiana, have invented certain new and useful Improvements in Coffee-Pots, of which the following is a specification.

My invention is an improved drip-coffee pot; and it consists in certain features of construction and novel combinations of parts, as will be hereinafter described, and pointed out in the claim.

Figure 1:
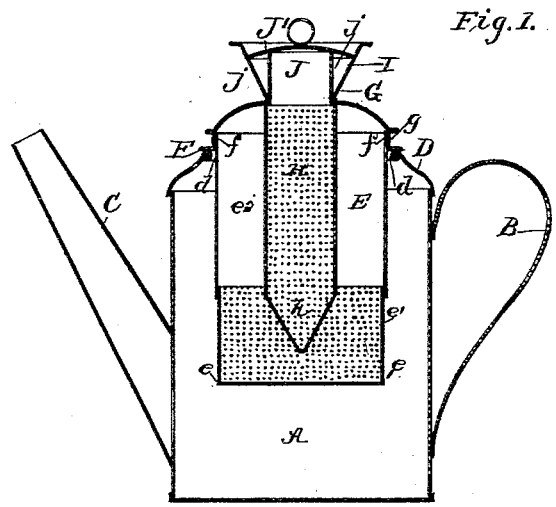
Figure 2:
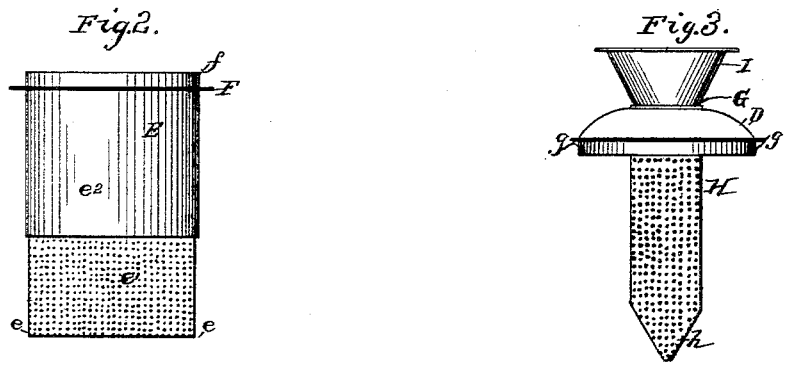
Figure 3:
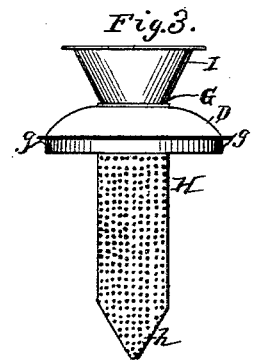
Figure 4:
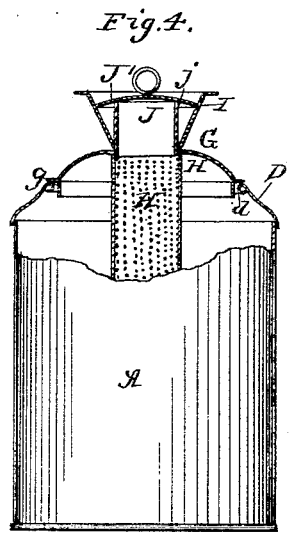

In the drawings, Figure 1 is a vertical longitudinal section of the coffee-pot. Fig. 2 is a detail view of the coffee-holder; Fig. 3, a detail view of the hot-water holder; and Fig. 4 is a view showing the hot-water holder arranged to serve as a top for the coffee-pot, the coffee-holder being omitted.

The coffee-pot A may have a handle B and spout C, as usual, and has its top D provided with the opening $d$, which is of considerably less diameter than the body of the pot, so that the coffee-holder fitted in the said opening will not fill the pot, but will leave ample room for the dripped coffee.

The coffee-holder E is in the nature of a cup or cylinder fitted to the opening $d$ and provided with a bottom $e$, the said bottom and the lower portions $e'$ of the sides of the holder being perforated by fine holes, the upper portion $e^2$ of the sides being imperforate, as shown. A short distance from its top the holder E has an outwardly-projected annular flange F, which rests upon the top D, as shown in Fig. 1, and the part $f$ of the holder projected above said flange F forms a nipple-like part to receive the depending ring-like portion $g$ of the cover G for the coffee-holder. This ring-like portion $g$ is adapted to fit down over the part $f$ when the coffee-holder is in place, and when such coffee-holder is removed and the coffee is to be served the cover G and parts connected therewith may be withdrawn from the coffee-holder and set to serve as a cover for the coffee-pot, the ring $g$ fitting down in the opening $d$, as shown in Fig. 3. This cover G is a part of the hot-water holder, which includes a small perforated cylinder H, depending centrally from the cover G and having a pointed lower end $h$, so that it may easily be inserted down in the ground coffee in the coffee-holder. The tube H is made sufficiently long to nearly reach the bottom of the coffee-holder when inserted therein, as shown in Fig. 1. To facilitate the filling of perforated tube H, it is provided above the cover G with a funnel-like top I, and the hot-water holder has a cover J, formed with a tube $j$ to fit in the top of the tube H and a plate or disk J' to fit the funnel I.

The operation is simple. The coffee-holder is placed in the pot, the coffee placed therein, the hot-water holder inserted, and hot water poured therein and permitted to drip through the coffee. After the coffee has dripped if further dripping is not needed at the table the coffee-holder may be removed and the cover G be placed on the pot, as shown in Fig. 3.

Having thus described my invention, what I claim as new is—

The improved coffee-pot, substantially as described, consisting of the pot proper, the coffee-holder fitted therein and having its upper portion within said pot imperforate and its sides near its lower end perforated, as described, the hot-water holder fitted in said coffee-holder and having its sides perforated at points opposite both the imperforate and the perforated portions of the coffee-holder, said hot-water holder being provided at its upper end with a cover G to close the top of the coffee-holder, and a cover for the hot-water holder, all substantially as and for the purposes set forth.

WILLIAM H. WRIGLEY.

Witnesses:
WALTER B. PARKER,
EDWIN T. DOWTY.